May 10, 1960
R. R. LOVE
2,936,048
TRAILER HITCH
Filed Jan. 4, 1957
3 Sheets-Sheet 2
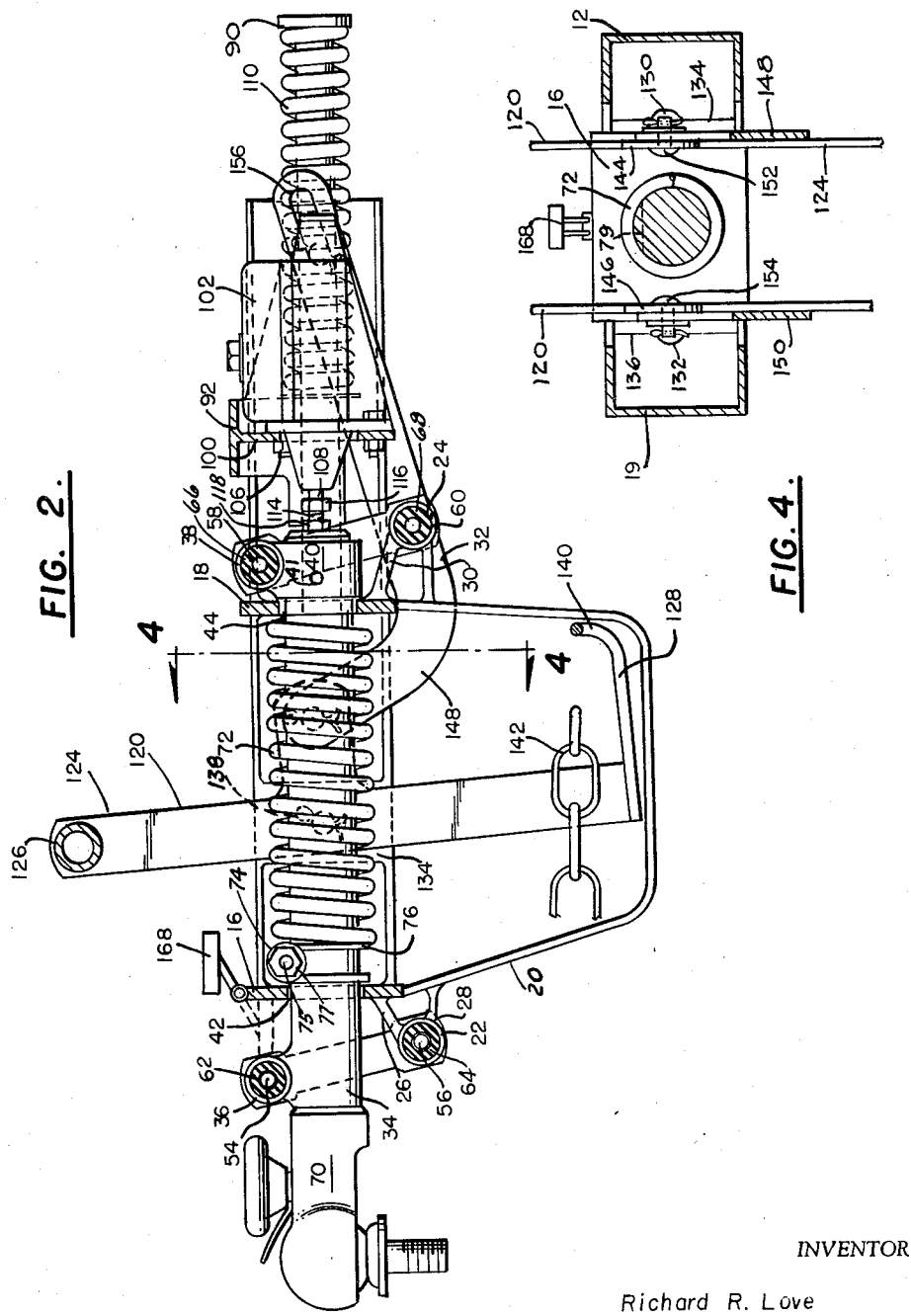
INVENTOR
Richard R. Love
BY
ATTORNEYS

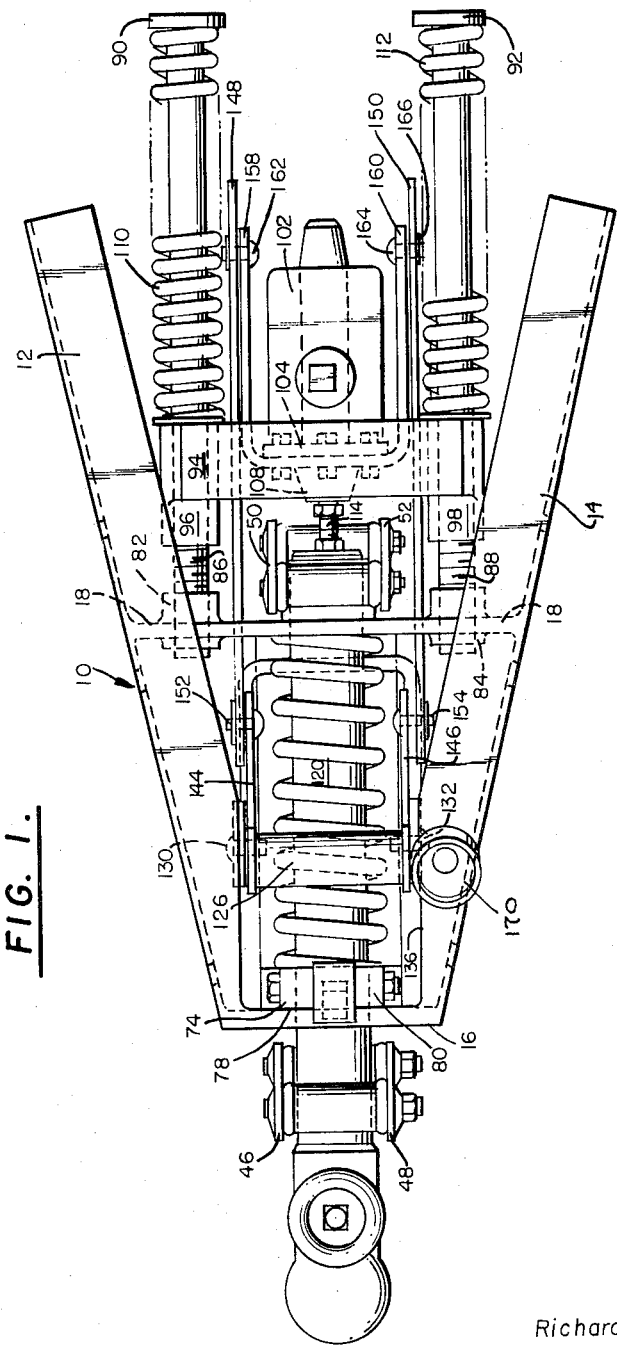

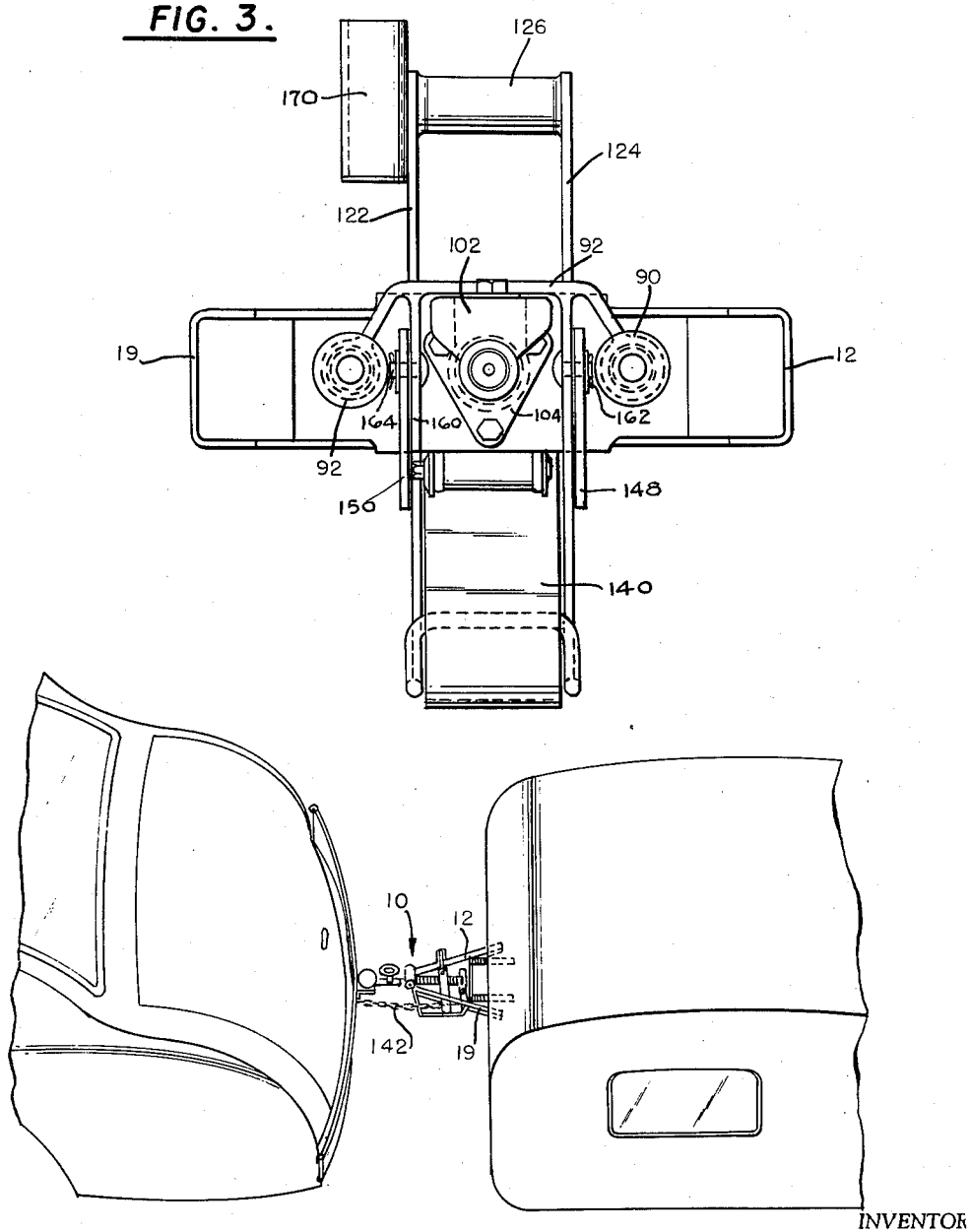

United States Patent Office 2,936,048
Patented May 10, 1960

2,936,048

TRAILER HITCH

Richard R. Love, Buhl, Idaho

Application January 4, 1957, Serial No. 632,453

19 Claims. (Cl. 188—112)

This invention relates to a trailer hitch and particularly to a trailer hitch embodying brake actuating means.

One of the objects of the invention is to provide a trailer hitch embodying automatic means for controlling the brakes of the trailer to effect the actuation of such brakes in accordance with the tendency of the trailer to overrun a towing vehicle.

Yet a further object of the invention is to provide a trailer hitch embodying means for setting the brakes on the trailer in the event that the hitch becomes disconnected or broken.

Another object of the invention is to provide a hitch embodying means which will control the operation of the trailer brakes so as to apply these brakes as the brakes of the towed vehicle are applied and furthermore which will prevent the trailer from overrunning the towed vehicle even when the brakes of the towed vehicle are not applied.

Hitches have been heretofore provided which embody means for actuating the brakes of trailers when the trailers tend to overrun the towing vehicles but in all instances known to me these hitches are unsatisfactory. The prior known hitches, for example, embody a mechanism which must be oiled, adjusted and protected, and further due to their complexity and general construction they are not such as to prove satisfactory for extended periods of use. Accordingly a further object of this invention is to provide a trailer hitch embodying a brake actuating means which will prove entirely satisfactory for use under all adverse conditions to which such a hitch may be subjected.

Further, accordingly, another object of the invention is to provide a trailer hitch in which there will be no necessity to oil or grease, and which once adjusted will operate for long periods without readjustment.

Another problem to be encountered with these prior known hitches is the possibility that there will be no release of the brakes when the condition which caused the operation of the brakes has been corrected. There is also likely to be no operation of the brakes when desired or at least a considerable lag in the operation of the brakes. This is due to the construction of these prior known devices such that, for example, they are apt to employ operating elements which will bind so as to prevent proper operation or complete release. Accordingly yet another object of the invention is to provide a trailer hitch as set forth above which will operate with no lag and with which a complete release will be achieved.

Yet a further object of the invention is to provide a trailer hitch as set forth above embodying not only a brake setting means effective when the trailer tends to overrun the towing vehicle and a hitch which will effect a complete release when such condition has been remedied, but also a hitch with which the brakes will automatically set should there be any disconnection of the trailer with the towing vehicle.

Yet another object of the invention is to provide the hitch as set forth above embodying a hitch safety chain as required by law wherein the safety chain is utilized in cooperation with means provided to set the brakes of the trailer should the hitch break.

Still another object of the invention is to provide a hitch as set forth above wherein there are means preventing excessive pressures in the brake system incorporated in the hitch particularly where such system embodies hydraulic means of operation. As will be seen hereinafter the hitch may be used with air, hydraulic, electrical or other forms of brakes. In the illustrated embodiments disclosed herein hydraulic means are provided.

A still further object of the invention is to provide a trailer hitch embodying brake actuating means with which a dangerous quick locking of the brakes cannot occur.

It is also an object to provide in a construction as set forth above means preventing damage to the brake system by quick action such as by surge in an hydraulic system which might occur when the driver of a towing vehicle applies the brakes too quickly.

The need to apply the brakes of a trailer when the trailer tends to overrun the towing vehicle automatically and instantly is apparent yet it is also apparent that it is often desirable to back the trailer. With a device embodied in the hitch which would automatically set the brakes when the load in the drawbar is changed from tension to compression it would be impossible to back the trailer. Accordingly a further object of the invention is to provide a hitch as set forth above wherein backing over relatively smooth level surfaces such as level roadways can be achieved without setting of the trailer brakes.

Yet a further object of the invention is to provide a hitch as set forth above wherein backing over rough terrain or up inclines which might tend to increase the load on the hitch sufficiently to normally set the brakes can be accomplished without the setting of the brakes.

A still further object of the invention is to provide a hitch connectable to trailers to be used in the normal manner for connecting these trailers to a towing vehicle embodying means for controlling the brakes as set forth above wherein no special connections such as cables, etc., must be made in addition to the usual connection of the hitch and the danger involved with loose cable lines, etc., is eliminated.

Yet a further object of the invention is to provide a trailer hitch embodying the above set forth features which is of simple construction and can be easily and cheaply built as compared to heretofore known hitches.

Further an object of the invention is to provide a hitch which is compact and can be easily attached to a trailer without making any changes in the trailer structure.

These and other objects and advantages will become apparent from the following description and the accompanying drawings wherein—

Figure 1 is a top plan view of a hitch constructed in accordance with the invention.

Figure 2 is a side elevational view with some elements being sectioned to improve the illustration.

Figure 3 is a front elevational view.

Figure 4 is a sectional elevational view taken along line 4—4 of Figure 2.

Figure 5 is a perspective top view illustrating a hitch as connected to a trailer and a towing vehicle.

A trailer hitch must provide secure connection between the trailer and the towing vehicle. Further, and particularly as the trailers increase in size, it is necessary to consider the forces involved when the brakes are applied to the towing vehicle and for this reason it has become necessary to develop brake actuating means for braking the trailers as the brakes of the towed vehicle are applied.

It is also necessary to provide means preventing the trailer from overrunning the towing vehicle. This invention includes providing means controlling the trailer brakes to prevent overrunning the towing vehicle.

It is customary to have a chain attached to the trailer and the towing vehicle. If the hitch breaks the chain maintains a connection between the trailer and towing vehicle. However, unless the trailer can be stopped quickly a serious accident may occur. The invention includes means which will cooperate with the chain to set the brakes should the trailer break loose. The degree of braking applied is preset. Further, once the brakes set they must be manually released. Simple means are provided for manually releasing the brakes.

The hitch is, nonetheless, compact, and can be easily attached to a trailer without making any changes in the trailer structure.

Referring now particularly to the drawings: A hitch constructed in accordance with the instant invention in its illustrated form comprises a frame 10. Frame 10 is composed of spaced sidebars 12 and 14, formed of angles, plate 16 and a cross brace 18. A U-shaped frame member 20 extends downwardly below and is connected to plate 16 and cross brace 18. Shackle type journals 22 and 24 are mounted on frame 10 being supported thereon by spaced plates or support arms 26, 28, 30 and 32. It is understood of course that these members can be formed as castings, or the whole frame 10 can consist of a welded unit, or in any other suitable manner. In the illustrated embodiment the members are seen to be welded together to form a unitary frame.

A hitch shaft 34 is provided with rubber shackle type journals 36 and 38. In the illustrated embodiment journal 36 is seen to be formed integrally with shaft 34 whereas journal 38 is mounted on a collar 40 with collar 40 being secured to shaft 34 by a pin 41. Shaft 34 extends through openings 42 and 44 in end plate 16 and cross plate 18, respectively. With openings 42 and 44 being of the size shown in the drawing it is necessary to provide a means for assembling shackle journal 38 on shaft 34 after the elements are assembled, that is after the shaft is placed in the position illustrated in the drawings. Therefore the shackle type journal 38 is mounted on the collar 40.

The shackle journals 36 and 38 and 22 and 24 are interconnected by the shackle plates 46, 48, 50, 52 and shafts 54, 56, 58 and 60 mounted in oilless rubber bushings 62, 64, 66 and 68. It is seen that the shackle construction thus provided is quite similar to those employed extensively in automobile suspension systems.

Hitch bar 34 has a hitch 70 of the usual construction connected thereto at its forward end. A spring 72 is concentrically mounted on bar 34 and bears against the front of cross brace 18. A stop in the form of a collar 74 is fixedly connected to shaft 34. The exact form of the collar is not important. In the illustrated development this collar 74 is seen to be formed of spring steel bands 76 connected at their ends to bosses 78 and 80. A collar bolt 75 and nut 77 are used to tighten the bands. Bolt 75 rests in a groove 79 in shaft 34, thus the collar cannot shift. With the elements in the relationship illustrated in the drawings it is seen that spring 72 bears against cross brace 18 and forces hitch bar 34 forwardly until stop 74 bears against plate 16.

Cross brace 18 is provided with a pair of spaced bosses 82 and 84. A pair of parallel tubular members 86, 88 are supported in bosses 82, 84. The tubular members and bosses are provided with mating threads so that the tubular members can be adjusted longitudinally. The tubular members are provided with heads 90 and 92. The heads 90 and 92 comprise pieces of sheet plate welded to the tubular members.

A carrier 94 which is provided with spaced bosses 96 and 98 is slidingly mounted on the pair of tubular members 86 and 88. The carrier 94 has a vertical web 100. The latter has suitable openings to receive bolts for supporting an hydraulic master cylinder 102. Cylinder 102 has a plate 104 adapted to abut against web 100 and has suitable spaced openings in alignment with the openings in plate 100 for reception of mounting bolts 106 and their associated nuts. The operating rod for the master cylinder piston extends forwardly through a suitable opening in web 100. This operating rod is seen at 108. A pair of springs 110 and 112 bear against heads 90 and 92 on tubular members 86 and 88 and urge carrier 94 forwardly. This of course also urges master cylinder 102 forwardly.

At its rear end hitch shaft 34 is provided with a threaded opening in which is threadingly mounted an operating bolt 114. Bolt 114 has a head 116 adapted to bear against operating rod 108. A lock nut 118 provides for adjustment of bolt 114. It is thus seen that springs 110 and 112 urge the operating rod 108 against bolt 114. Further it is apparent that with the elements assembled in a trailer as indicated in Figure 4 the hydraulic cylinder will be operated to actuate the hydraulic brakes on the associated trailer when the hitch shaft swings backwardly on its shackles overcoming the force of spring 72. The springs 110 and 112 are adjusted so that they will urge the hydraulic cylinder 102 to its normal forward position in which the pins 162 and 164 bear against the forward ends of slots 156. The springs exert a force sufficient to cause proper actuation of the brakes when the rearward brake operating movement of hitch bar 34 occurs. Should the hitch move so far rearwardly, quickly, as to cause a sudden surge, or should the pressure in the hydraulic line build up above what is desirable due to the hitch bar moving back further than usual the springs 110 and 112 will compress relieving this excess pressure condition. With proper design the excess pressure, if it occurs at all, will only be momentary. However, operation of the brakes will not occur with the elements in the illustrated relative positions despite the fact that the springs 110 and 112 urge the cylinder forwardly with sufficient force to actuate the brakes when shaft 34 moves rearwardly (to the right in Figure 2). Brake operation with the elements in this position is prevented by the following structure:

A toggle 120 has an operating arm composed of a pair of spaced vertical straps 122, 124 joined at their upper ends by a tubular connector 126 and at their lower end by a horizontal guard rod 128 pivotally supported on frame 10. This support is accomplished by means of pivot pins 130, 132 mounted in spaced webs 134 and 136 provided on frame 10 and pivotally receiving straps 122 and 124. Cotter pins 138 can be used to maintain the pivotal connection. The guard rod 128 is seen to extend rearwardly from the straps 122, 124 and have an upwardly extending portion 140 which forms a recess with straps 122 and 124 for receiving and supporting the safety chain 142.

Toggle straps 122 and 124 are each provided with a crank arm 144 and 146, and a pair of spaced brake operating arms 148 and 150 are pivotally connected to the crank arms 144 and 146, respectively, by pivot pins 152, 154. Cotter pins can be used to maintain the pivoted connections.

The brake operating arms are provided with slots 156 adapted to cooperate with web 100 of carrier 94. The web 100 of carrier 94 has rearwardly extending flanges 158 and 160 in which are mounted pivot pins 162 and 164, and these pins extend through the slots 156, being maintained in this position by cotter pins 166. The brake operating arms 148 and 150 extend beneath cross brace 18, and the pivot pins 162 and 164 are seen to be positioned on the longitudinal center line of the hitch with the pivot pins 162 and 164 bearing against the forward end of the slots 156. Pins 162 and 164 are so positioned by the springs 110 and 112. In this position it is seen that an over center relationship of the pivot pins 152 and 154 with respect to pivot pins 130 and 132 is achieved. The pivot pins 152 and 154 are above the longitudinal center line of shaft 34 and the pins 130 and 132 are on the center line. With this disposition of the pivots the springs 110 and 112 tend to rotate the toggle 120 counter-clockwise (as viewed in Figure 2). Such rotation stops when arms 148 and 150 strike brace 18. In order for the toggle to pivot clockwise as viewed in Figure 2 it would be necessary to compress the springs 110, 112. The toggle and brake operating arms thus limit the forward movement of the brake cylinder 102 as such movement is forced by the springs 110, 112. Thus relative opposite movement of shaft 34 and the brake actuating means (cylinder) 102 is limited while shaft 34 is in its normal rest position. The bolt 114 is adjusted so that the brakes are released when the elements are in normal rest position.

The brakes will normally operate only when the hitch bar 34 moves rearwardly and forces the operating rod 108 rearwardly with the springs 110, 112 normally maintaining the brake cylinder 102 in its indicated position. When the trailer overruns the towing vehicle the spring 72 will be compressed and the hitch bar 34 will move rearwardly turning on its shackle connections to frame 10. This will operate the master cylinder and the wheel brakes. Should there be a sudden lurch, or should the hitch shaft 34 move so far rearwardly as to be likely to undesirably increase the strain on the hydraulic or other system, as by a sudden surge, springs 110, 112 will deflect. Thus the construction provides a safety means for insuring that the hydraulic or other system will not be ruptured or damaged with possible complete failure of the brakes, and the wheels will not lock without warning. Further the springs 110 and 112 will adjust the positioning of the master cylinder so as to maintain a maximum desired pressure in the system no matter what the deflection of the spring 72. Of course, the pressure will go up and the brakes will be more firmly applied as the springs 110 and 112 are compressed. However, this can be controlled through the springs and by the adjusting means 86, 88.

If the hitch breaks, the chain 142, which is attached to the towing vehicle by any of the well known methods, will force the toggle 120 to rotate clockwise as viewed in Figure 2, and throw the pivot pins 152, 154 and arms 148 and 150 over center. This will disengage the brake operating arms from the cross brace 18, and when this occurs the springs 110, 112 can force the hydraulic cylinder forwardly with consequent setting of the brakes. Thus upon breaking of the hitch or disengagement the brakes on the trailer will be set at a force gauged by the setting of the springs 110, 112.

A toggle 168 is pivotally connected in the plate 16 and adapted to be swung from the solid line position illustrated in Figure 2 to the dotted line position illustrated in Figure 2. In the latter position toggle 168 prevents rearward movement of the hitch shaft 34.

Backing of the trailer can normally be accomplished with the elements as indicated in Figure 2. However, where rough ground is involved or an excessively heavy load, or an incline it may be found desirable to place the toggle block 168 in the dotted line position. With toggle 168 in the latter position operation of the brakes is prevented.

Toggle 120 has a sleeve 170 connected thereto. A rod can be inserted in sleeve 170 and the toggle rotated to move the pivot pins 152 and 154 below the center line of the hitch. This will allow the springs 110 and 112 to operate the master cylinder setting the brakes. There is thus provided a convenient and easy means for effecting a brake setting while the trailer is parked.

When the brakes are applied by operation of toggle 120, they will be held in this state by springs 110 and 112. Because of the over center condition assumed by toggle 120 the springs must be compressed in order to release the brakes. "Resetting" is accomplished by counter-clockwise rotation of toggle 120, and is facilitated by use of a rod inserted in sleeve 170. When pins 152 and 154 move over center, springs 110 and 112 will force the toggle to normal position. The brakes will then be released.

While I have shown and described the preferred form of my invention, it will be understood by those skilled in the art that many changes in form and details of construction can be made within the scope of the appended claims, and I claim an exclusive right to all changes, modifications, and forms coming within the scope of the appended claims.

I claim:

1. A trailer hitch comprising a hitch shaft, a frame, said hitch shaft being supported on said frame for longitudinal movement, said shaft having a normal rest position, a brake actuating means movably supported on said frame and movable in a direction opposite to the direction of movement of said hitch shaft, said brake actuating means having an operating rod, said operating rod constituting a portion of said actuating means movable with respect to other portions of said actuating means, resilient means urging said actuating means to move relatively oppositely to said hitch shaft, means connected to said shaft confronting said rod and engageable with said rod to operate said actuating means upon relative opposite movement of said shaft and said actuating means.

2. The apparatus of claim 1 wherein there are resilient means resisting movement of said hitch shaft.

3. The apparatus of claim 1 including means limiting movement of said actuating means oppositely with respect to said hitch shaft.

4. The apparatus set forth in claim 1 wherein said means for supporting said hitch shaft comprises bracket means connected to said frame, bushing means connected to said hitch shaft, and means pivotally interconnecting said bracket means and said bushing means.

5. The apparatus of claim 4 wherein said hitch shaft is pivotally mounted adjacent its forward and rear ends.

6. The apparatus of claim 1 wherein said actuating means is supported by a sliding element slidably connected to said first mentioned frame, said element being slidably mounted on a member for movement parallel to said hitch shaft and said resilient means comprising means mounted on the last mentioned member and bearing against said sliding element and urging said sliding element toward said shaft.

7. The apparatus of claim 1 including means for limiting said relative opposite movement of said actuating means with respect to said shaft while said shaft is in said normal rest position comprising a toggle movably mounted on said frame, said toggle being connected to said actuating means by means lying in the path of movement of the latter and operable to force movement of said toggle with respect to said frame when said actuating means moves with respect to said frame under the influence of said resilient means, limit means connected to said frame extending into the path of movement of said toggle during said movement of said actuating means under said influence while said shaft is in said normal rest position for limiting the movement of said toggle and said actuating means under said influence, said resilient means normally urging said toggle to engage said limit means.

8. The hitch of claim 1 wherein said hitch shaft is pivotally supported on said frame.

9. A hitch comprising a frame, a hitch shaft movably supported from said frame and movable longitudinally with respect to said frame, said shaft having a normal rest position, a slide frame slidably mounted on the first mentioned frame and slidable on a member extending in a horizontal direction, a spring means bearing against said member and against said slide frame and a brake actuating means connected to said slide frame, said brake actuating means having an operating rod, said operating rod being positioned in the path of movement of said hitch shaft, said spring means normally urging said brake actuating means against said hitch shaft and stop means operating rod limiting the movement of said brake actuating means operating rod against said hitch shaft under the influence of said spring means.

10. The apparatus of claim 9 wherein said stop means comprises an operating arm, means pivotally connecting said arm to the first mentioned frame at a pivot point, means pivotally connecting said arm to said actuating means at a location horizontally below the first mentioned point, the last mentioned means for pivotally connecting said operating arm to said actuating means including means forming a slot, a pin slidable in said slot, said spring means normally urging said pin against one end of said slot and urging pivotal movement of said operating arm with respect to said actuating means, stop means connected to the first mentioned frame and extending into the path of movement of said arm for limiting the last mentioned pivotal movement when said shaft is in said normal rest position, means connected to said frame for changing the positioning of said pivot point to a point horizontally below said location and for changing the path of movement of said arm to a path of movement away from said stop, said spring means being operable to pivot said operating arm about said pivot point and move said actuating means toward said hitch shaft with said operating rod bearing against said hitch shaft when said first mentioned pivot point is moved below said pivot location.

11. The apparatus of claim 10 including a toggle, means movably mounting said toggle on the first mentioned frame, said means pivotally connecting said arm to the first mentioned frame being mounted on said toggle, said toggle being movable to move the first mentioned pivot point below said pivot location.

12. The apparatus of claim 11 including said toggle having an arm extending at an angle with respect to said shaft and adapted to be engaged for movement of said toggle to move said first mentioned pivot point below said pivot location.

13. The apparatus of claim 12 including a guard means forming part of said frame and enclosing the latter arm.

14. A trailer hitch comprising in combination a frame, a brake actuating means slidably mounted on said frame, said means having an actuating rod movable therein and extending outwardly thereof, means on said frame confronting said rod and adapted to bear against said rod and move said rod relative to said actuating means to operate a brake system connected to the latter, means urging said brake actuating means toward said means confronting said rod to operate the brake system associated with said actuating means, means limiting the latter movement comprising a link means connected to said actuating means, said link means being movably connected to said frame, stop means connected to said frame, said link means bearing against said stop means to limit the movement of said actuating means toward said means confronting said piston.

15. The combination of claim 14 wherein said link means is pivotally connected to said frame by a toggle means, said toggle means being pivotally connected to said frame and to said link means, with the axis of pivotal connection of said toggle means to said frame being horizontally below said axis of pivotal connection between said toggle means and said link means and said actuating means being urged to move in a horizontal plane by said means urging said actuating means to move toward said means confronting said rod.

16. The combination of claim 15 including a member connected to said toggle, said member being operable for rotation of said toggle to move said pivotal connection between said toggle and said link laterally across the horizontal plane extending through said pivotal connection of said toggle to said frame.

17. The combination of claim 15 wherein said toggle means includes an arm extending outwardly from the pivotal connection of said toggle means to said frame, said arm being adapted to be engaged by a chain for rotating said toggle means about its pivotal connection to said frame to move the pivotal connection of said toggle means to said lever horizontally below the pivotal connection of said toggle means to said frame and to move said lever out of engagement with said stop means, said means urging said brake actuating means being adapted to move said toggle means about its pivotal connection to said frame when said pivotal connection between said toggle means and said link is horizontally below said pivotal connection of said toggle means to said frame to cause operation of said brake system.

18. The combination of claim 17 including means forming a recess on said arm adapted to receive and retain a chain.

19. The combination of claim 17 including a guard rod extending horizontally outwardly from said arm, said guard rod having an upwardly extending portion spaced from said arm, said guard rod forming an upwardly opening recess with said arm.

References Cited in the file of this patent

UNITED STATES PATENTS

| | | |
|---|---|---|
| 2,145,406 | Schroter et al. | Jan. 31, 1939 |
| 2,320,585 | Gill et al. | June 1, 1943 |
| 2,391,603 | Wagner | Dec. 25, 1945 |
| 2,463,716 | Richey | Mar. 8, 1949 |
| 2,662,616 | De Lateur | Dec. 15, 1953 |
| 2,716,471 | Long | Aug. 30, 1955 |